United States Patent [19]
Lindsay

[11] 3,969,936
[45] July 20, 1976

[54] INFLATION VALVE GAUGE
[76] Inventor: James E. Lindsay, 24712 Evereve Circle, El Toro, Calif. 92630
[22] Filed: May 14, 1975
[21] Appl. No.: 577,173

Related U.S. Application Data
[63] Continuation-in-part of Ser. No. 394,108, Sept. 4, 1973, abandoned.

[52] U.S. Cl. .................................. 73/146.8; 73/418
[51] Int. Cl.² ...................................... B60C 23/04
[58] Field of Search ............ 73/146.8, 146.3, 146.4, 73/146.5, 418; 137/227, 228

[56] References Cited
UNITED STATES PATENTS

| | | | |
|---|---|---|---|
| 1,061,472 | 5/1913 | Hackley | 73/146.8 |
| 1,855,088 | 4/1932 | Boenker et al. | 73/146.8 |
| 1,893,222 | 1/1933 | Bronson | 73/146.8 |
| 1,894,153 | 1/1933 | Brietzke | 73/418 |
| 3,213,688 | 10/1965 | Huston | 73/418 |
| 3,810,390 | 5/1974 | Neugebauer | 73/418 |

OTHER PUBLICATIONS
Sales Publication "Heise Gauges", 10–1966, one page.

Primary Examiner—Donald O. Woodiel
Attorney, Agent, or Firm—Lyon & Lyon

[57] ABSTRACT

An inflation valve gauge including a tubular stem having an inner end connected to a pressurized chamber such as formed by a tire, and an outer end provided with an inflation valve; the stem being surrounded by a special, helically wound Bourdon type pressure gauge tube, having an axially inner end penetrating a wall of the tubular stem and an outer end having a pointer overlying an axially directed scale plate; the gauge tube being surrounded by a sleeve which supports the scale plate and is joined to the stem axially inward from the gauge tube; the convolutions of the gauge tube being disposed in close proximity, the confronting wall surfaces of the stem and sleeve being in close proximity to the convolutions of the gauge tube to restrain the gauge tube against extreme mechanical forces tending to damage the gauge tube.

5 Claims, 7 Drawing Figures

INFLATION VALVE GAUGE

This application is a continuation-in-part of a previous application, entitled TIRE PRESSURE GAUGE, Ser. No. 394,108, filed Sept. 4, 1973, now abandoned.

BACKGROUND AND SUMMARY OF THE INVENTION

This invention relates to inflation valve gauges for tires and the like, and is particularly suited for, but not limited to the landing gear of large aircraft which utilize a plurality of large volume tires operating at high pressures, often in excess of 100 psig.

In present day installations, the inner tube or the wheel is provided with a stem having a fluid passage for introducing air or other gas under pressure into the pressure chamber of the inner tube or tubeless tire or the like. A check valve is mounted in the stem for controlling fluid flow into and out of the pressure chamber. The tire is inflated by coupling a source of higher pressure at the outer end of the stem. The tire is deflated by manually moving the valve plunger of the check valve against the action of the valve spring. The pressure in the tire is measured by coupling a pressure gauge to the outer end of the stem, with the gauge including a member for engaging and depressing the valve stem. Tire inflation and tire pressure checking are performed as separate, sequential steps, which usually must be repeated several times in order to achieve the desired tire operating pressure.

In the inflation valve gauge of the present application, a continuously indicating pressure gauge is built into the stem, permitting continuous monitoring of tire pressure during tire inflation and permitting checking of tire pressure condition at any time without removal of the stem cap and application of a separate pressure gauge. The inflation valve gauge of the present application is directly substitutable for the conventional stem and is readily installed by deflating the tire, unscrewing the conventional stem, screwing in the gauge of the present application, and inflating the tire.

Accordingly, it is an object of the present invention to provide a new and improved inflation valve gauge particularly suited for continuously monitoring tire pressure both during and subsequent to tire inflation, and one which is directly substitutable for conventional stems.

A further object of the present invention is to provide an inflation valve gauge utilizing a special helically coiled highly sensitive Bourdon type of gauge tube disposed between confronting walls so spaced that the guage tube normally clears the walls but is movable within its elastic limit into fully supported contact therewith when subjected to mechanical stresses such as that produced by high centrifugal stress and high acceleration or deceleration stress; the gauge tube, upon relief of such mechanical stress, returning to its initial condition without change in the accuracy of the indicated or monitored pressure.

Other objects, advantages, features and results will more fully appear in the course of the following description, where the drawing merely shows and the description merely describes preferred embodiments of the present invention which are given by way of illustration or example.

DESCRIPTION OF THE FIGRUES

Figure 1:
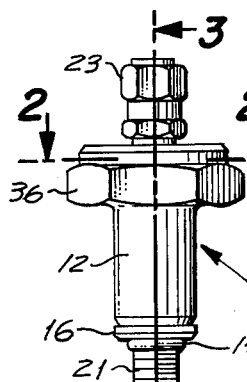
FIG. 1 is a side view of the inflation valve gauge.
Figure 2:
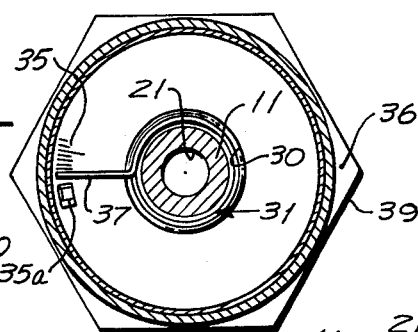
FIG. 2 is a transverse sectional view thereof taken through 2—2 of FIG. 1.
Figure 3:
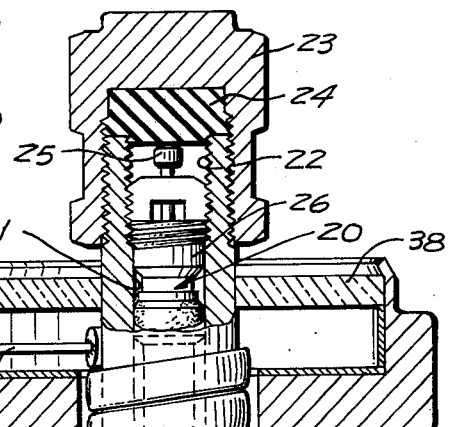
FIG. 3 is an enlarged longitudinal sectional view thereof, with portions in elevation, taken through 3—3 of FIG. 1.
Figure 4:
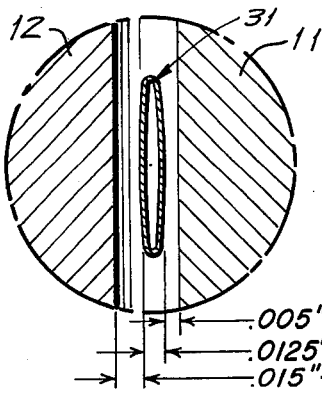
FIG. 4 is a further enlarged fragmentary sectional view thereof taken within circle 4 of FIG. 3.
Figure 5:
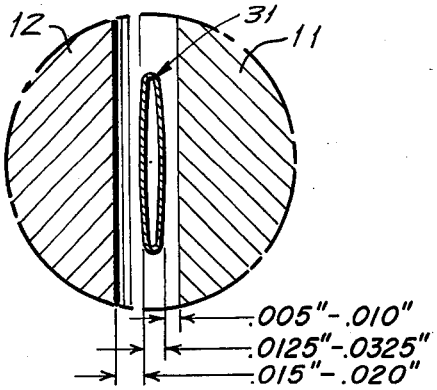
FIG. 5 is a still further enlarged fragmentary sectional view taken within circle 5 of FIG. 4.

The inflation valve gauge includes a body 10 with an inner stem 11 and outer sleeve 12. A threaded boss 13 on the stem 11 provides for mounting the gauge as, for example, on a wheel 14, with a pressure seal ring 15 positioned between a flange 16 and the wheel 14.

A conventional valve 20 is mounted in a central passage 21 of the stem 11, as by a threaded passage at 22. A conventional cap 23 may be threadedly mounted on the outer end of the stem 11, with a seal 24 therein. The valve 20 includes a plunger 25 sliding in a core 26, with a spring (not shown) urging the plunger upward to the valve closed position.

The outer sleeve 12 may be mounted on the flange 16, as by welding, providing an annular chamber 30 between the stem and sleeve. A helical Bourdon type gauge tube 31 is positioned in the chamber 30 between the stem and sleeve. The gauge tube 31 is formed by flattening a length of round tubing and then winding the flattened tubing into a helix. One end of the gauge tube remains round and is sealingly fitted with a round end tube 32 having relatively thick walls and reduced bore to reduce the rate of fluid flow into and out of the gauge tube. The end tube curves a part turn about the stem 11 then radially into the central passage 21 of the stem 11. The under side of the end tube 32 is bevelled as indicated by 32a. The outer end of the gauge tube 31 is closed.

A pressure indicator is carried in the body and typically comprises a scale plate 35 mounted in a cup-shaped flange 36 at the outer end of the sleeve 12, and a pointer 37 carried on the upper closed end of the tube 31. A transparent cover 38 rests on a spacer ring 40 extending peripherally from the scale plate 35, and the rim 41 is rolled over to hold the scale plate, ring and cover in place. The flange may have hex flats 39 providing surfaces for engagement with a wrench for installing and removing the inflation valve gauge.

Figure 6:
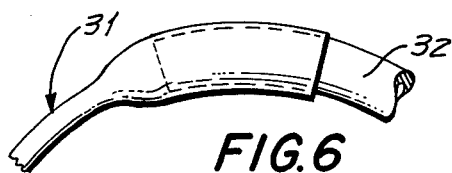
FIG. 6 is a further enlarged fragmentary plan view of the juncture between the gauge tube and mounting tube taken from 6—6 of FIG. 4.
Figure 7:
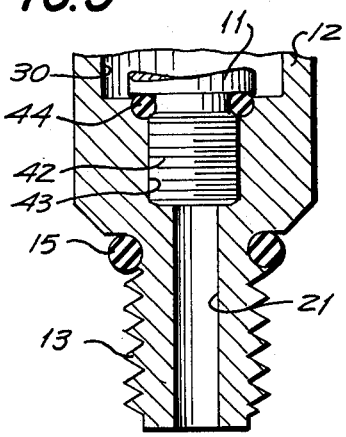
FIG. 7 is a fragmentary sectional view corresponding to FIG. 3, showing a modified construction.

An alternative embodiment which eliminates the welded joint between the stem 11 and sleeve 12 at the flange 16, is shown in FIG. 6, where elements corresponding to those of FIGS. 1 through 5 are identified by the same reference numerals. In the embodiment of FIG. 6, the threaded boss 13 is carried at the lower end of the outer sleeve 12. A threaded boss 42 is provided at the lower end of the inner stem 11 for mounting the stem in a threaded bore 43 in the boss 13, with a seal ring 44.

Both of the embodiments disclosed and described herein are used in the same manner.

The pressure gauge of the invention is threadedly inserted into the wheel 14 or other pressure chamber in the same manner as is the conventional valve stem, and may have the same size thread so as to be directly substitutable for the conventional valve stem. The tire is inflated by removing the cap 23 and applying the conventional pressure hose to the upper end of the stem. The pressure in the central passage 21 between the valve 20 and the wheel 14 is the same as the pressure in the tire. Hence the pointer 37 will indicate on the scale plate 35 the pressure of the tire, after the indicator has been calibrated. A stop 35a is formed on the scale plate 35.

The pressure gauge provides a continuous indication of the pressure of the tire throughout the inflation operation, so that the mechanic knows at all times the pressure in the tire. This is of particular importance where large volume tires and high pressures are utilized where over-pressuring during inflation can cause severe accidents and injury to equipment and personnel. Also, the continuous indication of tire pressure during use provides a very fast visual check of tire condition with a substantial reduction in inspection time when a plurality of tires on a large aircraft must be checked after every landing.

It should be noted that the size of the inflation valve gauge should be as small as possible. However, the stresses to which the gauge is subjected are tremendous, particularly when used on airplane wheels. For example, it is customary to have the axis of the inflation valve gauge parallel to the axis of the airplane wheel. As a consequence, the gauge is subjected to an extreme laterally applied acceleration force when the wheel initially engages the runway. This is followed by extreme laterally applied centrifugal force as the wheel rapidly increases rotation.

The present invention provides an inflation valve gauge which solves this problem by providing full support for the gauge tube 31. By way of illustration, an inflation valve gauge intended to withstand a normal maximum pressure of 550 psi, successfully withstood surge pressure in the order of 1200 psi and withstood accelleration forces in the order of 1000 gs.; had the following dimensions:

| | |
|---|---|
| Initial diameter of inconal tube before flattening | .060" |
| Wall thickness | .0025" |
| Flattened thickness of gauge tube, unpressurized | .0125" |
| Space between stem and gauge tube, unpressurized | .005"–.010" |
| Space between sleeve and gauge tube, unpressurized | .015"–.020" |
| Space between sleeve and gauge tube, maximum pressure (550 psi) | .0175" |
| Axial space between gauge tube coils | .003" |

It will be noted that the displacement required to bring the gauge tube into bearing contact with the stem 11 or the sleeve 12 is minimal and well within the elastic limit of the metal comprising the gauge tube as a result the extraneous mechanical stress transverse to the axis of the gauge tube 31 that the gauge tube is fully capable of withstanding the loads far in excess of those imposed under the stresses incidential to landing an aircraft even under abnormal conditions.

Do to the increased wall thickness of the end tube 32 it provides full support for the light weight gauge tube 31 even under axial loads, should the gauge tube extend radially inward from the aircraft tire. Also, due to the close confinement of the coiled gauge tube and the minimal space (0.003 inch) between coils the gauge tube is fully capable of withstanding excessive axial loads without buckling.

Having fully described my invention it is to be understood that I am not to be limited to the details herein set forth, but that my invention is of the full scope of the appended claims.

I claim:

1. An inflation valve gauge for connection to a pressurized means subject to high mechanical stress, said gauge comprising:
    a. a tubular stem connected to the pressurized means;
    b. an inflation valve sealing the tubular stem;
    c. a pressure gauge tube wrapped about the stem in the form of a cylindrical helix in close proximity thereto but normally spaced therefrom a distance of the order of 0.005 to 0.010 inches and with the coils thereof normally spaced apart about 0.003 inches;
    d. the gauge tube including a fixed end penetrating the stem to permit entrance of a pressure fluid into the gauge tube and a free end movable in response to pressure of the pressure fluid in the gauge tube to monitor the pressure thereof;
    e. and a sleeve surrounding the gauge tube in close proximity thereto but normally spaced therefrom a distance of the order of 0.015 to 0.020 inches;
    whereby the spacing between said gauge tube and said stem and sleeve is such that said gauge tube is elastically movable under mechanical stress into supported contact with the confronting surfaces of the tube and sleeve whereby, upon release of the mechanical stress, the gauge tube returns to its initial state to again monitor the pressure of the pressure fluid therein.

2. An inflation valve gauge, as defined in claim 1, wherein:
    a. the fixed end of the gauge tube protrudes into the bore of the tubular stem and is shaped to produce a reduce fluid pressure in the gauge tube during flow of pressure fluid into the pressurized means.

3. An inflation valve gauge, as defined in claim 1, wherein:
    a. the gauge tube includes a fixed end of circular cross section having increased wall thickness to provide axial support therefore and confined between the confronting walls to withstand high axial force to a direction toward the fixed end.

4. An inflation valve gauge for connection to a pressurized means subject to high mechanical stress, said gauge comprising:
    a. a body member having a cylindrical bore and a flanged end;
    b. a tubular stem within the bore forming with the body member an annular chamber extending from the flanged end, the tubular stem protruding from the flanged end;
    c. means for connecting the end of the body member opposite from the flanged end to the pressurized means;
    d. means in said flanged end forming a disk chamber receiving an axially directed scale disk and a transparent cover through which the tubular stem protrudes;
    e. an inflation valve within the protruding end of the tubular stem;
    f. a sealing cap enclosing the protruding end of the tubular stem;
    g. a gauge tube coiled in the annular chamber in the form of a cylindrical helix spaced from said stem a distance of the order of from 0.005 to 0.010 inches and with its coils normally spaced axially about 0.003 inches and spaced from said body member a distance of the order of 0.015 to 0.020 inches.

5. An inflation valve gauge as defined in claim 4, wherein a. the fixed end of the gauge tube is provided with walls of increased thickness and a bore of reduced diameter to increase the strength of the gauge tube at the fixed end and to minimize the bleed off rate through the gauge tube in the event of breakage.

* * * * *